No. 813,678. PATENTED FEB. 27, 1906.
J. W. SUTTON.
VEHICLE SPRING.
APPLICATION FILED JAN. 21, 1905.
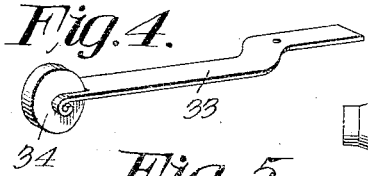
Fig. 1.
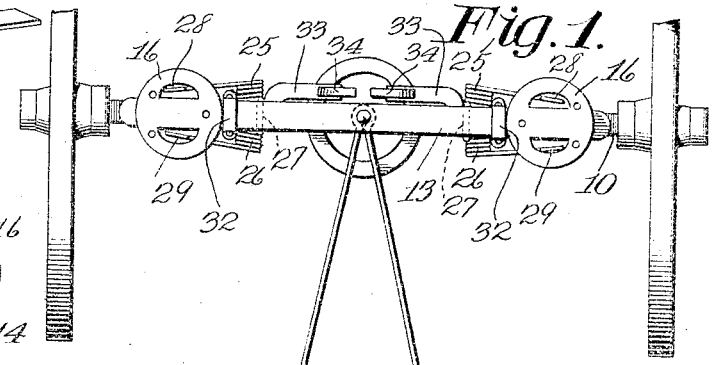
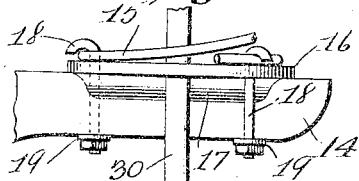
Fig. 4.
Fig. 5.
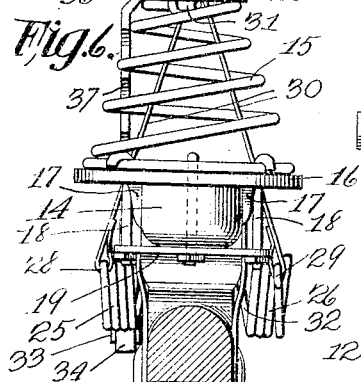
Fig. 6.
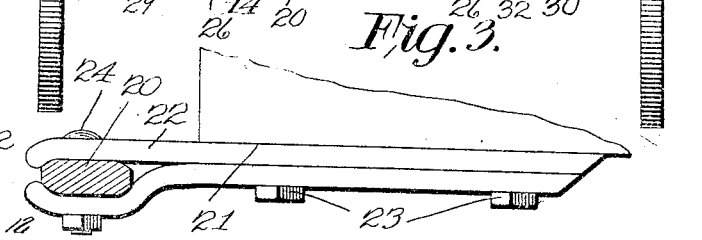
Fig. 3.
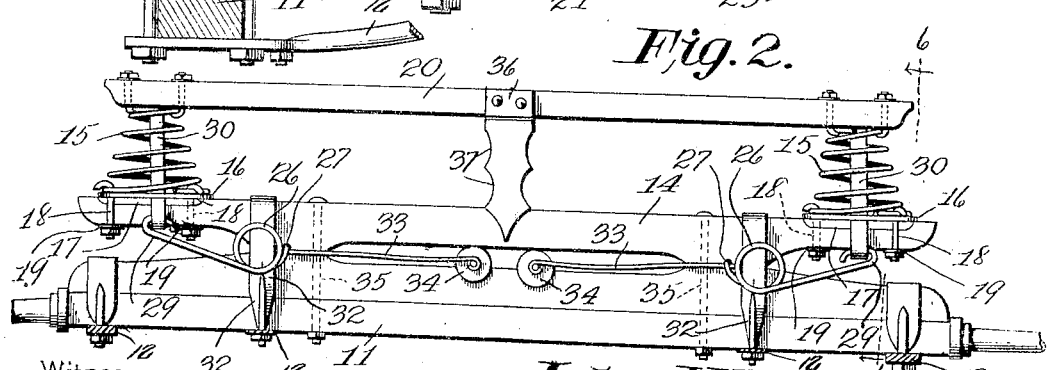
Fig. 2.
Witnesses
E. J. Stewart
C. N. Woodward
John W. Sutton, Inventor
by C. A. Snow & Co.
Attorneys

UNITED STATES PATENT OFFICE.

JOHN W. SUTTON, OF COLLINSVILLE, INDIAN TERRITORY.

VEHICLE-SPRING.

No. 813,678.     Specification of Letters Patent.     Patented Feb. 27, 1906.

Application filed January 21, 1905. Serial No. 242,143.

*To all whom it may concern:*

Be it known that I, JOHN W. SUTTON, a citizen of the United States, residing at Collinsville, Cherokee Nation, Indian Territory, have invented a new and useful Vehicle-Spring, of which the following is a specification.

This invention relates to improved means for mounting the bodies of vehicles upon the running-gear, and has for its object to secure increased ease and comfort to the occupants and prevent rebounding after abnormal depression of the springs, and thus obviate "jolting" or unpleasant vibrations to the body of the vehicle when driving over rough roads.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a plan view of the running-gear of a vehicle with the improvements applied. Fig. 2 is a rear elevation of the rear axle, together with the spring-bolster and spring construction and other attachments. Fig. 3 is an enlarged detail of the improved clip device, whereby the body portion of the vehicle is coupled to the running-gear. Fig. 4 is an enlarged perspective view of the "jolt-relieving spring" detached. Fig. 5 is an enlarged side view of portions of the spring-supporting mechanism. Fig. 6 is an end elevation of the parts shown in Fig. 2 enlarged and with the axle in section on the line 6 6 of said figure.

The improved device may be applied to any of the various constructions of vehicles manufactured, but is more particularly applicable to carriages, buggies, and similar vehicles, and for the purpose of illustration is shown applied to a conventional construction of running-gear and body of an ordinary vehicle of this character, 10 11 representing the axles, 12 the reach, 13 the forward spring-bolster, and 14 the rear spring-bolster.

The "reach" portion of the device will preferably be widely extended for connection to the rear axle to increase the stability, and generally the "fifth-wheel" upon the forward axle will be larger than usual for the same reason.

The improved springs are formed in coil shape, as at 15, preferably conical, and connected between the rear axle 11 and the rear of the body portion and between the forward bolster 13 and the forward portion of the body, the means whereby the coupling is accomplished being part of the novel features of the present invention and which will now be described.

Attached to the bolster members 13 and 14 near the ends are plates 16, the latter having spaced ribs 17 for bearing over the bolster members and connected thereto by clip-bolts 18 and clamp-plates 19, the bolts having hooks upon the upper ends for engaging the lower whirls of the coiled springs. By this means the plates and lower ends of the springs are both secured firmly in position by the same clip-bolts.

Connected to the body portion of the vehicle, both at front and rear, are beams 20, one only being shown, the coupling being made by clip-bars 22, bolted, as at 23, to the under side of the body portion (indicated at 21) and embracing the beams 20 and bolted thereto, as at 24.

Attached, respectively, to the axles 10 11 are relief-springs for absorbing the jars or concussions to which the springs are liable, and thus effectually prevent undue vibrations or lateral movements to the body portion, while at the same time permitting a requisite amount of lateral and longitudinal movement. The relief-springs consist of spaced coils 25 26, each connected by an integral bar 27, fitting in a transverse cavity in the under sides of the bolsters 13 14 and with their free ends extended and terminating in loops 28 29 to receive straps 30, the latter passing upward through apertures in the plates 16 and engaging loops 31, attached to the under sides of the bolsters within the coiled springs. The relief-springs thus exert constant strains upon the supporting-springs 15, both from above and below, and holds them in equilibrium, so that all tendency to undue lateral or vertical movement is checked and the jars and concussions very largely absorbed and prevented from being unduly imparted to the body of the vehicle.

The bolsters 13 14 are connected to their respective axles by clips 32, and between the bolsters and axles at the points where the clips are applied spring-plates 33 are disposed, the spring-plates extended laterally and projected toward the center of the axles and provided at their inner terminals with rollers 34, the rollers being thus spaced apart a short distance centrally of the running-gear. The bolsters and axles, together with the spring-plates, are further strengthened and supported by clamp-bolts 35.

The cavities for the transverse integral members 27 of the relief-springs 25 26 pass through the bolsters next to the spring-plates 33 and are held in position thereby when the axles and bolsters are clamped together.

Attached centrally of the beams 20 are plates 36, "dart-shaped" at their lower ends and with spaced recesses 37 in their sides, for engagement with the rollers when the body portion of the vehicle is depressed below the normal, as when subjected to a sudden jolt when suddenly engaging an obstruction or rough places in the road. The lengths of the plates 36 will be so proportioned relative to the location of the rollers 34 that the plates will not engage the rollers so long as the vehicle is operating under normal conditions; but in event of any abnormal depression of the body portion and springs caused by sudden contact with an obstruction or in riding rapidly over rough roads or from other cause the dart-shaped plates 36 will come in contact with the rollers and the downward movement resisted thereby and undue vertical movement thereby prevented. If the downward movement is sufficiently strong, the spring-plates will be depressed sufficiently to permit the rollers to pass into the recesses 37 and be thus checked in the return or upward movement, and undue jolting action effectually prevented. By this simple means the unpleasant and annoying tendency of the body portion to rebound violently when one or more of the wheels meet an obstruction or drop into a rut or other cavity is counteracted and the jolting force absorbed by the spring members 33. This portion of the device is of especial value and advantage when employed upon top buggies or carriages, as the unpleasant and annoying tendency of the tops to sway or "whip" about when the above-described jolts are produced is obviated, and no danger therefore exists of injury or annoyance to the occupants of the vehicles from that source. Another advantage of this construction is that in event of the draft-animals suddenly jumping forward or suddenly stopping the limited degree of longitudinal movement permitted to the spring structure will effectually prevent this action from producing any unpleasant or harmful effect upon the occupants of the vehicle, and the same is true in event of any sudden lateral movement which may be imparted to the running-gear from any cause.

It will thus be noted that a simply-constructed and durable spring structure is produced which may be installed upon any of the various forms of buggies and carriages manufactured and may also be easily adapted for the heavier class of vehicles, if required, and while permitting a requisite degree of both lateral and longitudinal swaying or vibration in addition to the usual vertical movement will effectually check and retard all undue movement, and also effectually prevent unpleasant rebounding movements from jolts or abnormal movements imparted to the running-gear. The strength of the springs 15 being much greater than the strength of the springs 33, the latter will yield after the force of the rebound is exhausted, and thus permit the members 36 to be gradually withdrawn from engagement with the rollers 34 and without producing any unpleasant effects upon the occupants of the vehicle.

Having thus described the invention, what is claimed is—

1. In a vehicle, a spring formed of a coil of resilient wire, means for coupling said spring between the running-gear and the body of the vehicle, a relief-spring connected at one end to the running-gear, and a flexible coupling element between the free end of said relief-spring and the vehicle-body and extending through said coiled spring.

2. In a vehicle, a plate having spaced apertures and with means for coupling to the running-gear of the vehicle, a spring formed from a coil of resilient wire and connected at one end to said plate and at the other end to the body of the vehicle, a relief-spring connected at one end to the running-gear and extending at the other end beneath said plate, and flexible coupling means between said vehicle-body and the free end of said relief-spring and extending through the apertures in said plate.

3. In a vehicle, a spring formed of a coil of resilient wire, means for coupling said spring between the running-gear and the body of the vehicle, a relief-spring formed of spaced coils connected at one end by a transverse bar and with the other ends extended, said transverse connecting-bar disposed between the bolster member and axle of the vehicle, and a flexible coupling element between the free ends of said relief-spring and the vehicle-body.

In testimony that I claim the foregoing as my own I have hereunto affixed my signature in the presence of two witnesses.

JOHN W. SUTTON.

Witnesses:
A. J. BAUER,
N. O. CALHOUN.